(12) United States Patent
Vizireanu et al.

(10) Patent No.: US 8,311,391 B2
(45) Date of Patent: Nov. 13, 2012

(54) METHOD AND SYSTEM FOR ANALYZING AND MARKING A FILM

(75) Inventors: Ion Vizireanu, West Lake Village, CA (US); Mike Arthur Derrenberger, Hopkinton, MA (US); Yousef Wasef Nijim, Valencia, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 405 days.

(21) Appl. No.: 12/308,528

(22) Filed: Aug. 5, 2010

(65) Prior Publication Data

US 2010/0296795 A1    Nov. 25, 2010

(51) Int. Cl.
    *H04N 9/80* (2006.01)
(52) U.S. Cl. ........................................ 386/252; 386/253
(58) Field of Classification Search .................. 386/252, 386/253, 257, 254, 232, 233
    See application file for complete search history.

(56) References Cited

U.S. PATENT DOCUMENTS

| | | | |
|---|---|---|---|
| 4,577,961 A * | 3/1986 | Terashita | ........................ 355/77 |
| 7,206,409 B2 | 4/2007 | Antonellis et al. | |
| 8,090,145 B2 * | 1/2012 | Vizireanu et al. | ............. 382/100 |
| 2002/0120849 A1 | 8/2002 | McKinley et al. | |
| 2003/0123660 A1 | 7/2003 | Fletcher et al. | |
| 2004/0156111 A1 | 8/2004 | Roddy et al. | |
| 2006/0049262 A1 | 3/2006 | Elo et al. | |

FOREIGN PATENT DOCUMENTS

WO    WO2005027500    3/2005

OTHER PUBLICATIONS

International Search Report, dated Jul. 6,2007.

* cited by examiner

*Primary Examiner* — Robert Chevalier
(74) *Attorney, Agent, or Firm* — Robert D. Shedd; Robert B. Levy (57) ABSTRACT

A method and system for analyzing and marking a film include determining color conditions which define colors compatible with a proposed mark, retrieving a number of consecutive frames to be marked, and determining potential marking areas within an image of each frame of the film. The color components associated with each potential marking area are analyzed to generate color values, and the color values of each of the potential marking areas are compared with the respective color conditions for determining ideal marking areas. Actual marking locations in the film are determined from the determined ideal marking areas.

20 Claims, 6 Drawing Sheets

METHOD AND SYSTEM FOR ANALYZING AND MARKING A FILM

This application claims the benefit, under 35 U.S.C. §365 of International Application PCT/US2006/024336, filed Jun. 21, 2006, which was published in accordance with PCT Article 21(2) on Dec. 27, 2007 in English.

FIELD OF THE INVENTION

The present invention generally relates to film security, and more particularly, to a method and system for analyzing and marking a film image for anti-piracy purposes.

BACKGROUND OF THE INVENTION

Piracy concerns in connection with the theatrical exhibition of motion picture films are at the forefront of concerns for the motion picture industry. Once a film distributor distributes prints of a motion picture film to exhibitors for theatrical exhibition, often a certain degree of control over the product is lost. For example, in the regular course of exhibiting the film in a theater, whether analog or digital, a customer in the theater may surreptitiously record the film using, for example, a hand held camcorder during the presentation. At a more sophisticated level, a person seeking to obtain an illegal copy of a film print may gain access to a theater projection booth in collusion with an employee of the exhibitor and make a copy of the film after hours in a relatively controlled environment. In such an environment, the audio from the projection equipment can be directly fed to the camcorder and a tripod can be used to ensure a clear and steady picture. As a result, an illicit copy of relatively high quality can be made. Furthermore, the print may also be scanned to create a video master.

Such illicit "pirate" copies of a movie can then be distributed over the Internet or by using hard copies (video CDs or DVDs), and this reduces the economic value of the legitimate film distribution. With the advent of the Internet and affordable higher quality recording devices, this problem has become increasingly severe in recent years. Thus, a method for tracing the origins of the illegal copies is highly desirable.

In 1982, the Motion Picture Association of America (MPAA), together with the Kodak™ Corporation, developed a technology for uniquely identifying film prints. This technology is commonly known as Coded Anti-piracy (CAP) coding. The code is a series of faint dots in the picture that are added as the print is manufactured. Approximately one out of every hundred frames contains four tiny dots that have been added to the image. Generally, 11 CAP-coded frames are required to reconstitute the serial number of the movie print. Each unique configuration of dots corresponds to a print identifier. The film prints are usually coded for each particular theater in which a film is distributed.

In the past, aiming an analog camcorder at a theater screen produced a poor quality, flickering image, but the coding dots usually survived the copying and reproduction process so that the serial number of the movie print could be obtained. However, the advent of digital video compression and distribution technologies has diminished the viability of CAP coding. Improved digital camcorders not only take higher quality pictures, but video compression algorithms, which are commonly employed when the pirated film is stored in a digital format or transported over the Internet, tend to obliterate the CAP codes. Specifically, because the dots representing the code are extremely small and diffuse, they are susceptible to disintegration during video compression. Furthermore, the loss of a single CAP code dot during image compression can defeat the CAP coding scheme because the CAP code is represented by spatial image placement within the film frame. Indeed, CAP coding is dependent upon 100% image survival. However, increasing the frequency of code image repetition in CAP coding systems increases the likelihood that the public will see the image. This is undesirable as it can distract viewers from the film content or cause them to form an opinion that a particular theater shows poor quality prints.

In an attempt to correct the deficiencies of the prior art, both Technicolor™ and Deluxe™ film laboratories have introduced newer systems that improve upon CAP coding. These systems place different patterns of dots in different frames of the film to be marked, and use these patterns to encode a serial number for the print. However, in such systems the locations of the marks within a frame have either been uncontrolled or fixed, which limit the capabilities of the new marking techniques.

As such, a method and system are needed for marking a film in a manner that provides a marked film which is robust and durable, avoids the limitations and deficiencies of CAP coding, and provides markings which survive pirating and compression, yet which are invisible to a viewer.

SUMMARY OF THE INVENTION

The present invention provides a system and method for analyzing and marking a film image for providing a marked film with robust marks which have a high survival rate during, e.g., unauthorized duplication. The present invention provides the ability to facilitate the choosing of ideal locations, patterns and types of marks for marking a film image that can be used for forensic purposes to trace the film, e.g., in cases of piracy.

In one embodiment of the present invention, a system for analyzing and marking a film includes a prescreening device configured to superimpose a depiction of potential marking areas with the film, the prescreening device including a marking module. The marking module comprises a color analyzer configured to analyze color in potential marking areas of each frame of the film for determining ideal locations for applying a mark, and a sequence analyzer configured to analyze and select a plurality of consecutive frames which comprise actual marking locations in the film.

In an alternate embodiment of the present invention, a method for analyzing and determining mark locations in a film includes the steps of determining color conditions which define colors compatible with a proposed mark, retrieving a number of consecutive frames to be marked, and determining potential marking areas within an image of each frame of the film. Color around each potential marking area is analyzed to generate color values, and the color values of each potential marking area are compared with the color conditions for determining ideal marking areas. Actual marking locations in the film are determined.

In an alternate embodiment of the present invention, a method for analyzing color in a film for determining ideal marking areas for placement of a mark includes the steps of determining color conditions which define color values compatible with the mark, determining a number of consecutive frames in the film to be marked, determining at least one potential marking area within at least one frame of the film, analyzing the color in a test area surrounding the potential marking area to generate test area color values, comparing the color values of the test area with the color conditions for determining if the test area is ideal for placement of the mark; determining a location (X,Y) in a frame in a sequence of frames in the film equal to the number of consecutive frames to be marked, and determining if at least one color condition is satisfied for the location (X,Y) in at least two frames out of the sequence of consecutive frames tested.

BRIEF DESCRIPTION OF THE DRAWINGS

The teachings of the present invention can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF PREFERRED EMBODIMENTS

The present invention advantageously provides a method and system for marking film prints for, for example, antipiracy purposes. Although the present invention will be described primarily within the context of a film marking system comprising specific components for scanning and marking films, the specific embodiments of the present invention should not be treated as limiting the scope of the invention. It will be appreciated by those skilled in the art and informed by the teachings of the present invention that the concepts of the present invention can be advantageously applied using various other configuration and components. That is, the following description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that the elements and operations depicted in the accompanying figures can be implemented in various forms of hardware, software or combinations thereof. Preferably, these elements are implemented in a combination of hardware and software on one or more appropriately programmed general-purpose devices, which may include a processor, memory and input/output interfaces.

Figure 1:
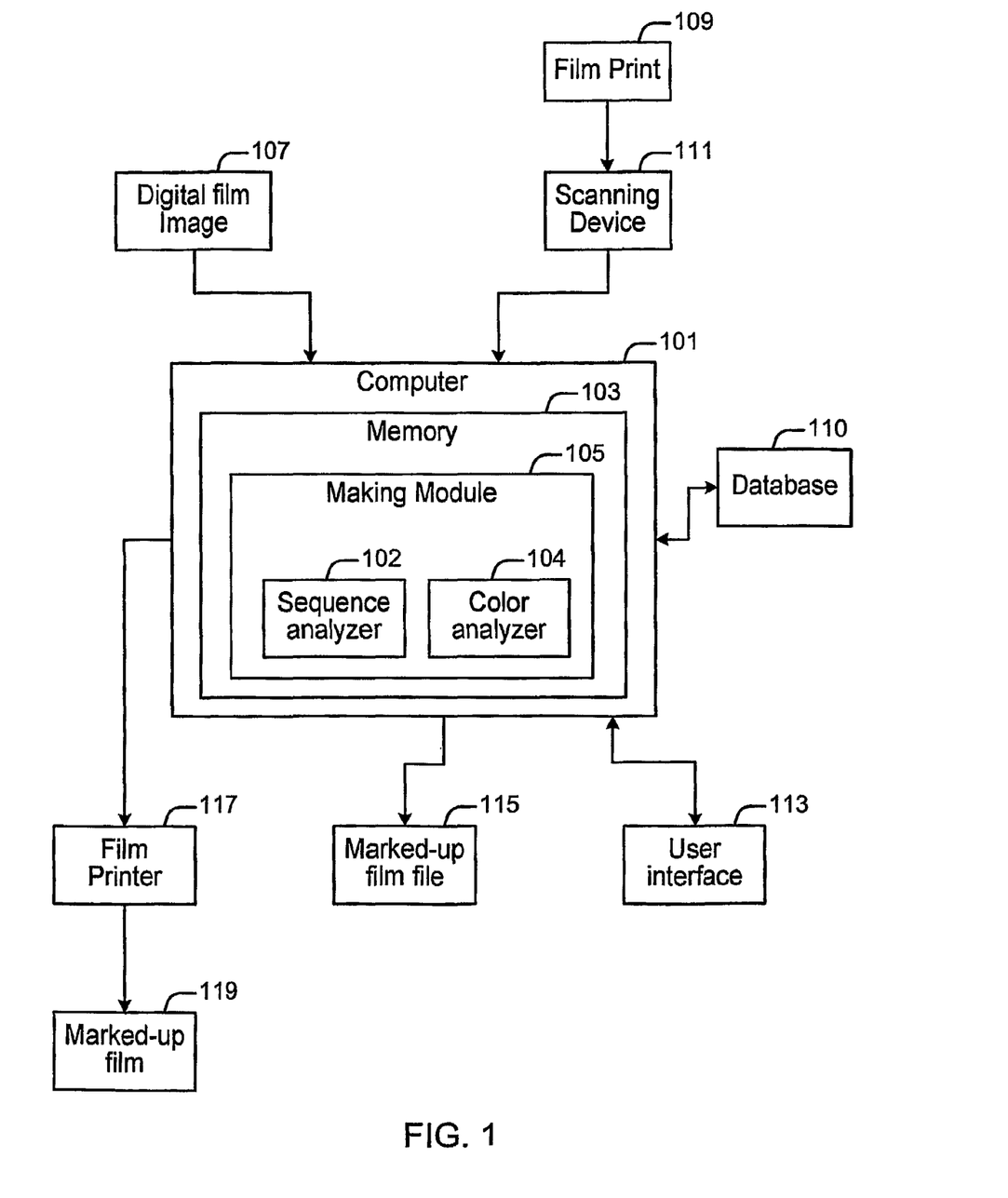
FIG. 1 depicts a high level block diagram of a marking system in accordance with an embodiment of the present invention.

FIG. 1 depicts a high level block diagram of a film marking system in accordance with an embodiment of the present invention. In the film marking system of FIG. 1, a scanning device 111 receives film content. The scanning device 111 is provided for scanning film prints 109 to generate a video output from the film prints 109. The scanning device 111 can comprise, for example, a telecine or any device that is able to generate a video output from a film print input. The video output from the scanning device is communicated to a marking device 101 in accordance with the present invention.

Alternatively, files from a post production process or digital cinema 107 (e.g., files already in computer-readable form) are communicated directly to the pre-screening device 101. Potential sources of computer-readable files are AVID™ editors, DPX files, D5 tapes etc.

The prescreening device 101 of FIG. 1 illustratively comprises a memory 103 and a marking module 105 including a sequence analyzer 102 and a color analyzer 104. The sequence analyzer 102 and color analyzer of the marking module 105 evaluate and process the received film content such that the images of the received film content can be marked in accordance with the present invention. More specifically, the color analyzer 104 analyzes the color in potential marking areas of each selected frame of a plurality of frames for determining 'ideal' (i.e., acceptable) locations for applying a mark in accordance with the present invention.

More specifically, in one embodiment of the present invention, a color analysis is based on the RGB (Red Green Blue) color model format. A color component in the RGB color model can be described via numeric representations which indicate how much of each of the red, green and blue color is included. Each color can vary between minimum (no color) and maximum (full intensity). If all the colors are at a minimum, the result is black, whereas if all the colors are at maximum, the result is white. Color values may be written as numbers in the range 0 to 255; for example, full intensity red may be written as: 255, 0, 0.

At a time prior to analyzing the color in an image, the minimum and maximum values as well as a maximum standard deviation of each of the three colors RGB which are deemed ideal (e.g., recommended/acceptable) for mark placement are determined. The RGB min/max values can be determined experimentally by the color analyzer 104 and can depend on, for example, the wavelength of the marking device (e.g., marking laser, LED, fiber optics, etc.) and/or the sensitivity of the film relative to the wavelength of the marking device that is being used. Accordingly, the RGB max/min/maximum standard deviation values are preferably determined for each potential marking device that is to be used for marking.

Thus, a plurality of color conditions is defined which may be based on the hardware (type of marking device used) and visibility of the marks being used. That is, a set of predefined conditions is preferably determined for each of the possible types of marks/marking devices which can be used. If the pre-defined conditions are met for a particular proposed mark, this will indicate areas in the image where that particular mark will be robust and likely to be recoverable in the event of illegal copying and compression.

For example in one embodiment of the present invention, three conditions (e.g., C1, C2, C3) for defining a first level of minimum/maximum RGB values and maximum standard deviations (which determine 'recommended' areas) are defined based on an actual test of the colors RGB (red, green, blue) with each type of mark/marking device to be implemented:

C1=((R min<R mean<R max) and (R Std dev<R Std dev max))

C2=((G min<G mean<G max) and (G Std dev<G Std dev max))

C3=((B min<B mean<B max) and (B Std dev<B Std dev max)).

Another set of three conditions (e.g., C4, C5, C6) with more relaxed minimum/maximum values than the C1, C2 and C3 conditions (e.g., a second level defining 'acceptable' values) can be defined for the three colors, RGB, for each type of mark and marking device:

C4=((R min<R mean<R max) and (R Std dev<R Std dev max))

C5=((G min<G mean<G max) and (G Std dev<G Std dev max))

C6=((B min<B mean<B max) and (B Std dev<B Std dev max)).

These conditions define subspaces in the colorimetric space. For example, C1 and C4 are centered on the red; C2 and C5 are centered on the green; and C3 and C6 are centered on the blue. The predefined conditions can be used to determine recommended, acceptable and not acceptable areas of, for example, a film image, which are compatible with specific marks and/or marking devices for optimal placement of a particular mark.

In one embodiment of the present invention, the recommended, acceptable and not acceptable conditions can be specified in the following format:

Recommended: C1 or C2 or C3
Acceptable: C4 or C5 or C6
Not Acceptable: if none of the above conditions are met.

For example, a Recommended condition for the red color which may be compatible with a particular mark can comprise: C1 having a R min=128, R max=255 and a standard deviation of 16.

An Acceptable condition for the red color which may be compatible with a particular mark may comprise a more relaxed condition C4, with R min=96, R max=255 and Std dev=32.

According to one embodiment, if color values in a test area for a particular proposed marking satisfy any single one of the predefined conditions C1, C2, C3, C4, C5 or C6 of that proposed marking, this may indicate that the test area is a recommended or acceptable area for placement of that marking.

Referring back to FIG. 1, the sequence analyzer 102 of the making module 105 examines the acceptable locations for applying marks determined by the color analyzer and determines if at least one condition is satisfied for determining if an acceptable location will be selected as a marking location. The marking module 105 can also make available different colors, shapes, or sizes of marks for applying to an image to be marked in accordance with the present invention.

For example, the sequence analyzer 102 analyzes each sequence of consecutive frames having ideal marking locations for determining actual marking locations in received film/digital content. For example, a location in the film where an actual mark can be placed can comprise a sequence of frames in which at least one predetermined condition is satisfied at a specific location within at least two frames out of a sequence of consecutive frames tested.

In one embodiment of the present invention, the sequence analyzer 102 preferably displays the image of each selected frame along with information that can be used to select marking locations. Useful information can include a frame number or time mark and some indication of the available marking locations. For example, in one embodiment of the present invention, a scene grid can be superimposed over the image of each selected frame.

Figure 4:
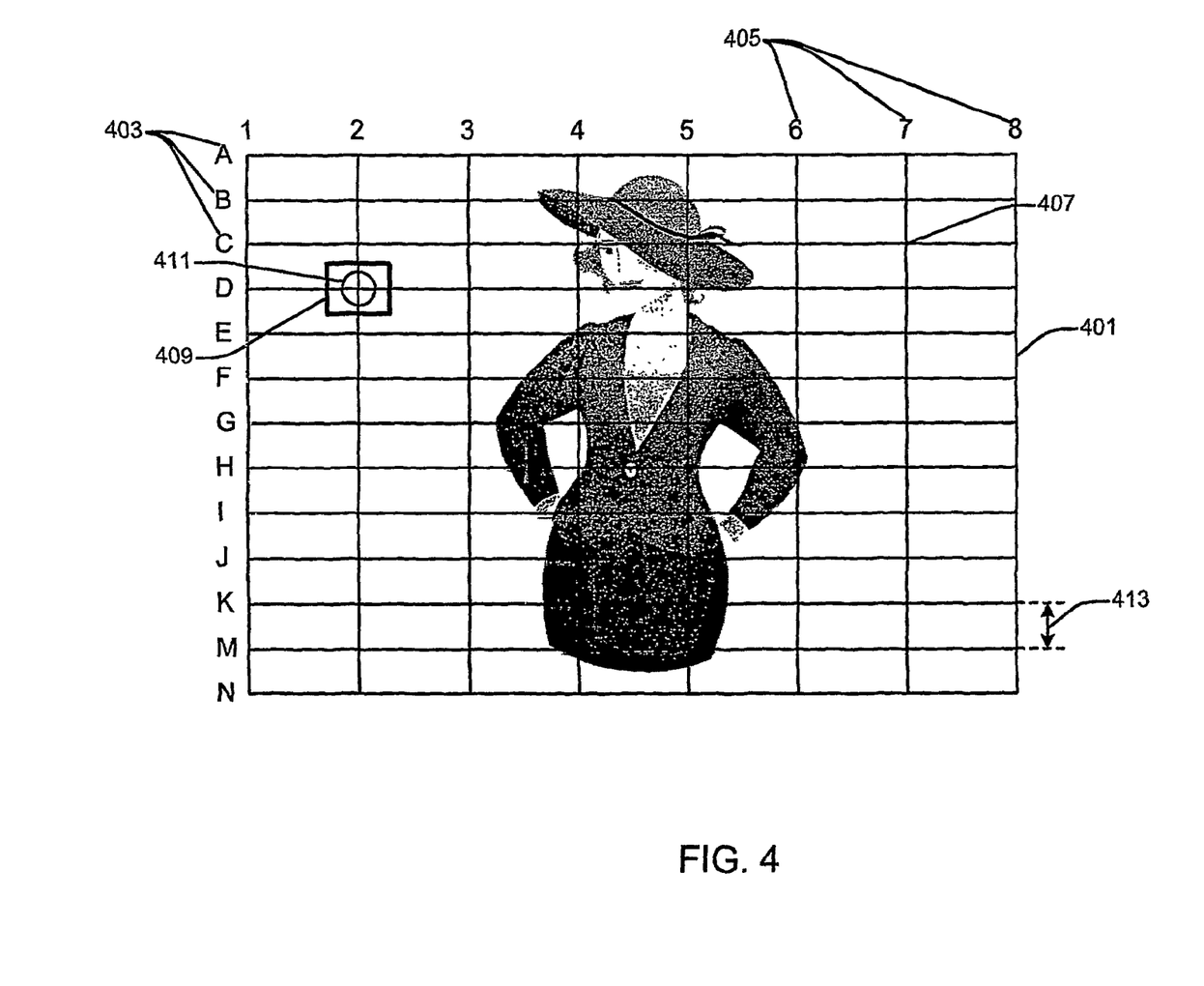
FIG. 4 illustratively depicts image content to be marked using a scene grid in accordance with an embodiment of the present invention.

For example, FIG. 4 illustratively depicts a film image to be marked in accordance with an embodiment of the present invention. The film image of FIG. 4 has a scene grid superimposed. The scene grid 401 of FIG. 4 can be superimposed over a film image to compare the aspects of the film image (characters, scenery, etc.) with the locations of the potential marking areas. Advantageously, the exact position of the grid 401 relative to the film print with image can be determined, and accordingly, the exact location of the mark relative to the image in the film can be assessed. A superimposed image can be examined and ideal grid intersections identifying potential mark areas can be determined for marking.

More specifically, as depicted in FIG. 4, a rectangular grid 401 can be provided comprised of a plurality of labeled columns 405 and rows 403, which define a plurality of intersections (potential marking areas) in which a mark can be placed. That is, a grid can be provided including sections (illustratively rectangular section) having identification axes. In accordance with the present invention, a user interface can enable a user to click on desired mark locations using a pointing device. In FIG. 4 an exemplary test area 409 surrounds a potential mark 411. That is, for each mark 411, a test area 409 of L×L can be provided and the test area analyzed (i.e., each pixel within the area L×L is tested). For example, the color analyzer 104 of FIG. 1 can perform an analysis of the color values in a test area surrounding each potential mark area in the frame to determine test areas which are 'ideal' (e.g., recommended or acceptable) for applying a mark. The sequence analyzer 102 analyzes the color information from the color analyzer 104 regarding ideal marking locations for determining actual marking locations in the film/digital image content.

In one embodiment of the present invention, the value of L of FIG. 4 is equal to the height 413 of each single row 403 (e.g., distance between the horizontal lines). L can be displayed in microns ($L_{microns}$) and can depend on, for example, the resolution of the hardware being used to print the film. Exemplary resolutions can comprise, for example, 64, 128 and 256 lines per frame, and the resolution in microns (i.e., for a 64 line grid, the resolution would be 300 microns). As such, L would equal 300 microns. However, the value $L_{microns}$ can be characterized as pixels ($L_{pixels}$) for purposes of working with digital images. As such, the value of L can be characterized according to equation one (1), which follows:

$$L_{pixels} = N \times L_{microns} \text{ (wherein } N\text{=number of pixels per micron)}. \quad (1)$$

In various embodiments of the present invention, the size of the mark 411 of FIG. 4 is proportional to the size of the film (e.g., the size of the mark is equivalent to about 1/200 of the vertical height of the film), and is preferably a minimum size of about 100 microns. The size of mark 411 in FIG. 4 is for illustrative purposes only, and is not to scale.

Referring back to FIG. 1, in the marking system, a storage device 110 (e.g., illustratively a database) is provided for storing, for example, predefined conditions which, when satisfied, determine whether a potential marking area is ideal (recommended or acceptable) for placement of a mark. Such predefined conditions are preferably determined at any time prior to performing a color analysis for each potential mark color and can be determined experimentally based on the limitations of the hardware (e.g., the wavelength of the marking device and/or the sensitivity of the film for the wavelength being used) and/or the visibility of the marks. For example, for each potential mark color (e.g., marking laser) to be used, color values which define ideal corresponding colors to the mark color can be experimentally determined. Ideal corresponding colors to the mark color are those colors which give a particular mark color the best chance of survival after a copying or reproduction processes, or after digital video compression. Although in FIG. 1 the database 110 is illustratively depicted as a separate component, in alternate embodiments of the present invention, the database of the present invention can be incorporated into the pre-screening device 101. The database 110 may be externally provided on a server accessible via a network (e.g., Internet).

The output of the pre-screening device 101 can comprise a marked up film print file 115. In addition, the output of the pre-screening device 101 can be communicated to a film printer 117 for providing a marked up film print 119. The resultant output of the pre-screening device 101 can be made ready for, for example, distribution to theaters. The database 110 of the marking system 100 of FIG. 1 can further store information regarding to where each uniquely coded film print was delivered.

In accordance with the present invention, the pre-screening device 101 analyzes film images and recommends potential locations and types of marks to help minimize the use of marks which may not be effective or may be distracting to someone viewing the image or film content. Indeed, if marks are made at undesirable locations, the marks may not survive (e.g., be detectable) unauthorized reproduction (e.g., camcorder recording). The present invention reduces the possibility of marking, for example, dark scenes or scenes with colors where the mark will not survive after printing the film, and enables the selection of better marks with, for example, different shapes that will survive unauthorized reproduction and compression schemes.

The present invention includes a method and system which are directed at least in part to examining the color components of film content, such as RGB (red, green, blue) to determine a set of predefined conditions ('color filter'). To generate the predefined conditions, the effect of, for example, background colors on the visibility of the mark is taken into consideration. In addition, preprocessing of the image, such as contrast, gamma correction, etc, can also be performed. The methods of the present invention include at least calculating a mean and standard deviation of the RGB color values of a selected area. In one embodiment, the color filter will be applied to determine the recommended, acceptable or unacceptable areas for presentation to the user, and the user can thereafter make a final decision as to where to apply the mark(s). The ideal color of the mark is based on the background color of the film image (i.e., different color marks have different effects on different colors). The color filter thus has clipping capabilities that are based on the physical effects of the mark on film.

Figure 2:
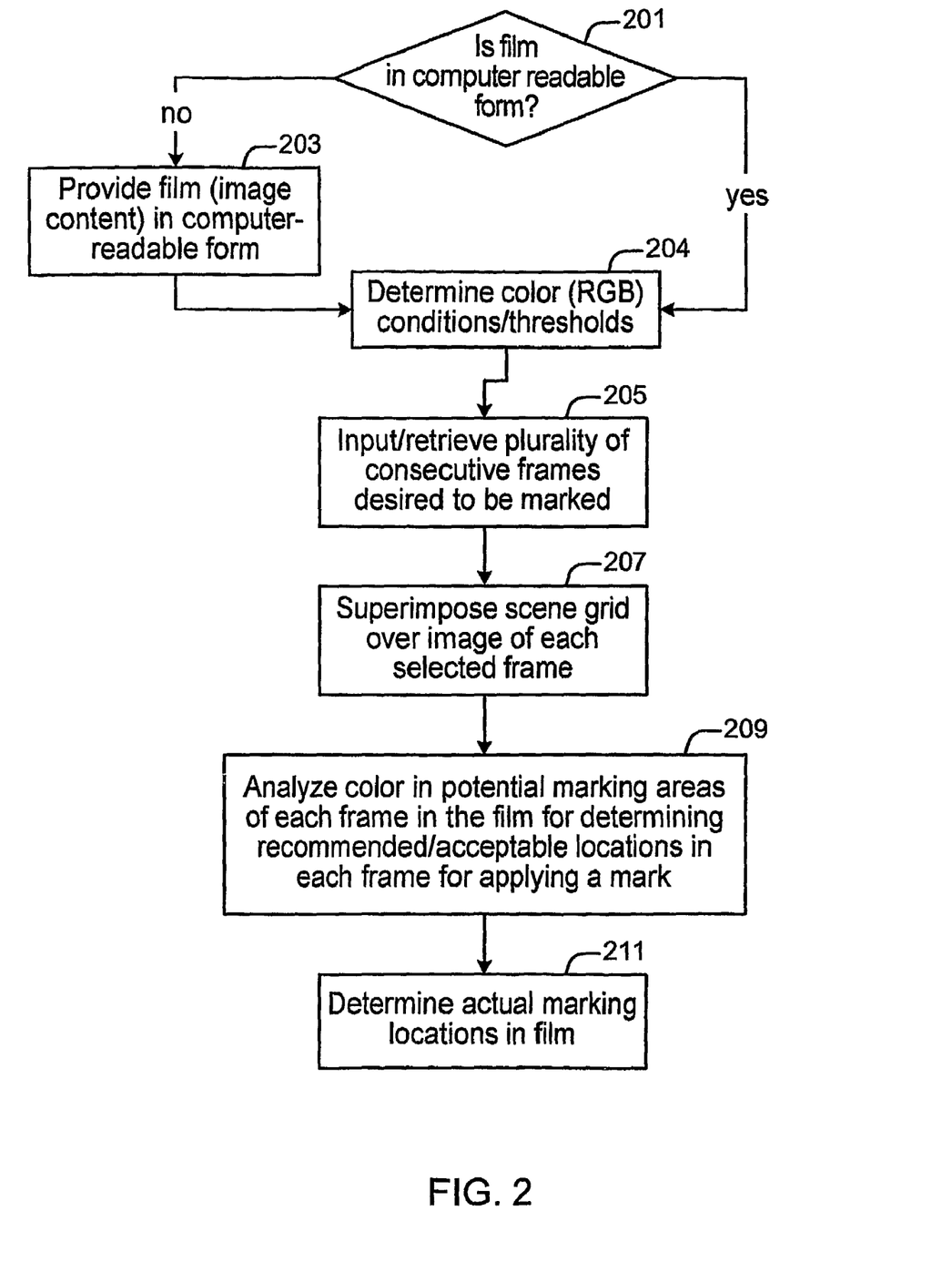
FIG. 2 depicts a flow diagram of a method for marking image content in accordance with an embodiment of the present invention.

For example, FIG. 2 depicts a flow diagram of a method for marking a film in accordance with an embodiment of the present invention. The method of FIG. 2 begins at step 201, where it is ascertained whether the film content is in a computer-readable format. If the film print is not in computer-readable format, the method proceeds to step 203. If the film print is in computer-readable format, the method skips to step 204.

At step 203, and in accordance with one embodiment of the present invention, the film is scanned to convert the film print into computer-readable format. Although in step 203, a film is scanned to convert the film print to a computer-readable format, other methods or means known in the art can be used to convert a film into a computer-readable format (e.g., digital format). The method then proceeds to step 204.

At step 204, color conditions are defined as described above by, for example, the color analyzer 104 of FIG. 1. That is, a set of predefined conditions is preferably determined for each of the possible types of marks and or marking devices which are implemented to produce a marked film output. The method then proceeds to step 205.

At step 205, a number of frames to be marked are identified. For example, in one embodiment of the present invention, a user can input to the pre-screening device 101 via the user interface 113 a number of frames in film/digital cinema content to be marked. Preferably, a minimum of at least two frames is selected for marking, however, if no entry is made, a default number of two consecutive frames can be automatically selected for marking. The method then proceeds to step 207.

At step 207, a scene grid is superimposed over the film/digital print/image content for each of the selected frames for determining possible marking locations as described above. The method then proceeds to step 209.

At step 209, each of the possible marking locations determined in step 207 is analyzed by for example, the color analyzer 104 as described above, to determine acceptable and recommended marking locations. The method then proceeds to step 211.

At step 211, the acceptable and recommended marking locations determined in step 209 are used to determine actual marking locations. For example, a location in the film/digital print/image content where an actual mark may be placed can comprise a sequence of frames in which at least one predetermined condition is satisfied. The method is then exited.

Figure 3A:
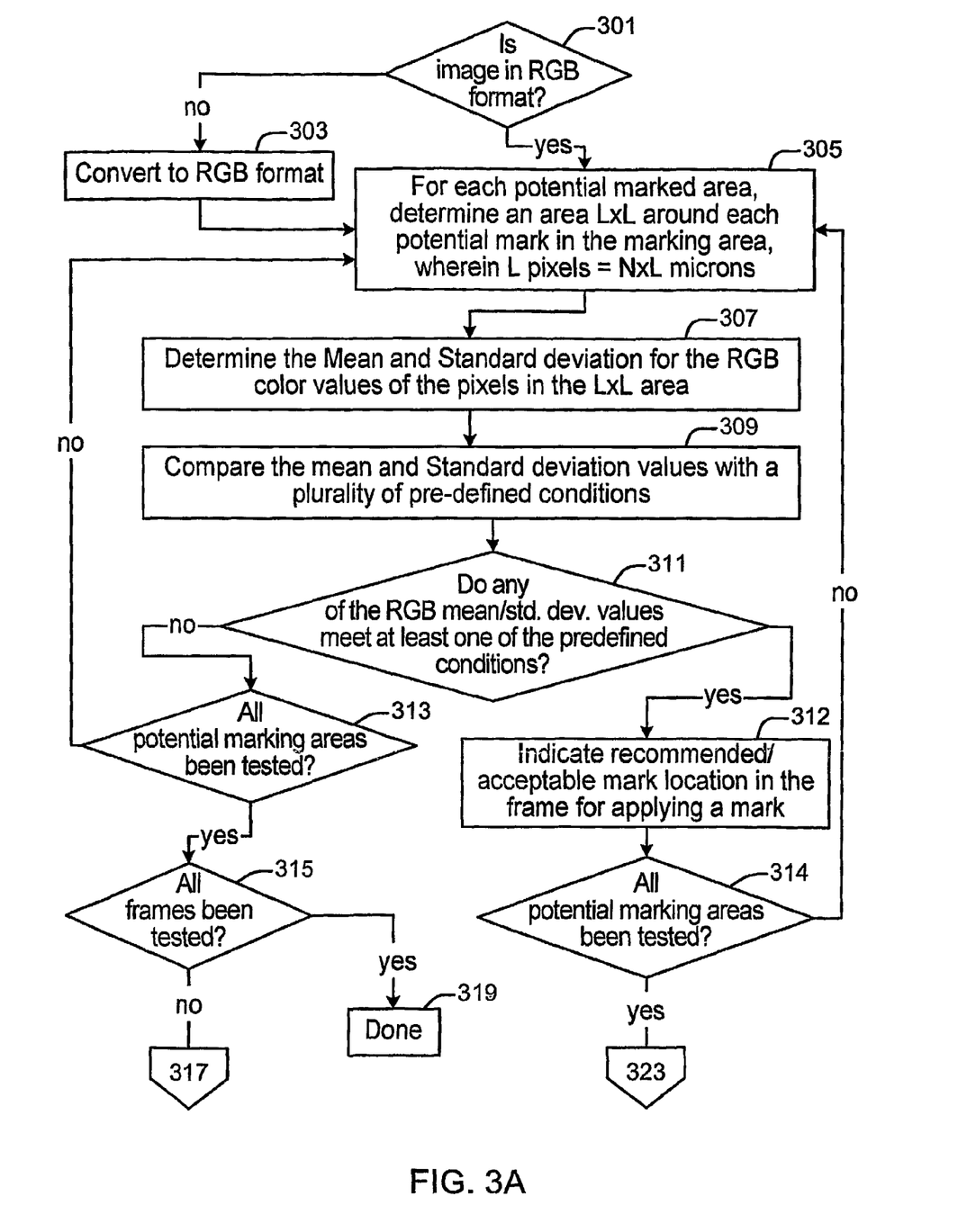
FIG. 3 depicts a flow diagram of a method for color analyzing possible marking locations of image content in accordance with an embodiment of the present invention.
Figure 3B:
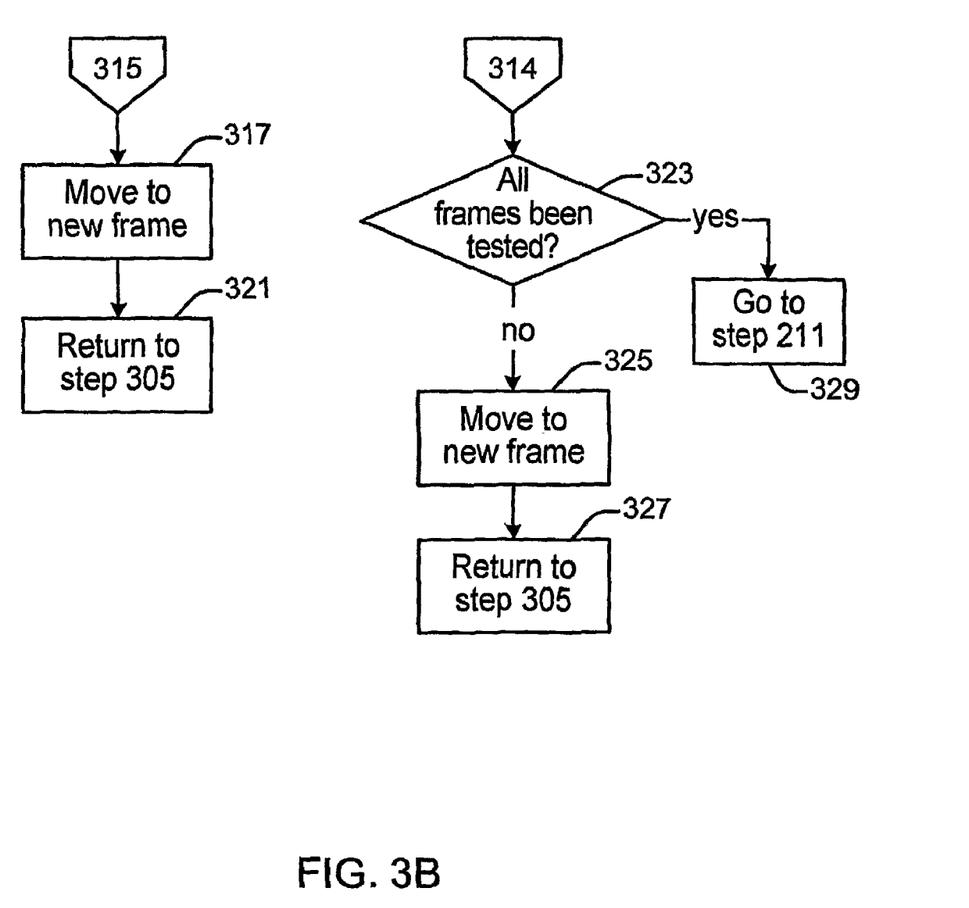

FIG. 3 depicts a flow diagram of a method for color analyzing possible marking locations of image content as recited in step 209 of FIG. 2 and in accordance with one embodiment of the present invention. The method of FIG. 3 begins at step 301 where it is determined whether the image is in a RGB format. If the image is in a RGB format, the method skips to step 305. If the image is not in a RGB format, the method proceeds to step 303.

At step 303, if the image in not in a RGB format (i.e., the image is in YUV color format), in one embodiment of the present invention a color space conversion is performed and the image is converted to RGB format. The method then proceeds to step 305.

At step 305, for each potential marking area, a test area is determined for each potential mark within a potential marking location within the frame. In one embodiment of the present invention and referring to FIG. 4, potential marking areas of a frame can include the grid intersections of a superimposed scene grid. The method then proceeds to step 307.

At step 307, mean values and standard deviations of each of the three colors RGB of the pixels in the respective test areas are determined. That is, the values R mean, R Std dev, G mean, G Std dev, and B mean, B Std dev are determined for the pixels in the respective test areas. The method then proceeds to step 309.

At step 309, the RGB mean and standard deviation values of the test area are compared with the pre-defined conditions determined in, for example, step 204 of FIG. 2. The method then proceeds to step 311.

At step 311, it is determined whether the mean/standard deviation values for any RGB color component in the test area meets any of the pre-defined conditions (e.g., C1-C6). If any RGB color component in the test area meets any of the predefined conditions, the method proceeds to step 312. If none of the RGB color components in the test area meet any of the pre-defined conditions, the method skips to step 313.

At step 312, the qualified potential marking area is indicated as recommended or acceptable for application of a mark, according to which set (e.g., C1, C2, C3 or C4, C5, C6) of conditions are satisfied. The method then proceeds to step 314.

At step 314, it is determined if all potential marking areas in the frame have been tested. If all potential marking areas in the frame have been tested, the method proceeds to step 323. If all potential marking areas in the frame have not been tested, the method returns to step 305 for assessing a different marking area.

At step 323, it is determined whether all desired frames in the image content (film prints) have been tested. If all desired frames in the image content have been tested, the method of skips to step 329. If all desired frames in the image content have not been tested, the method proceeds to step 325.

At step 325, a new frame in the image content is retrieved for marking. The method then proceeds to step 327.

At step 327, the method returns to step 305.

At step 329, the method of FIG. 3, skips to step 211 of the method of FIG. 2.

Returning to step 313, at step 313 it is determined whether all potential marking areas have been tested. If all potential marking areas have been tested, the method proceeds to step 315. If all potential marking areas have not been tested the method returns to step 305.

At step 315, it is determined whether all desired frames in the image content (film prints) have been tested. If all desired frames in the image content have been tested, the method of skips to step 319. If all desired frames in the image content have not been tested, the method proceeds to step 317.

At step 317, a new frame in the image content is retrieved for marking. The method then proceeds to step 321.

At step 321, the method returns to step 305.

At step 329, the method of FIG. 3 is exited.

Figure 5:
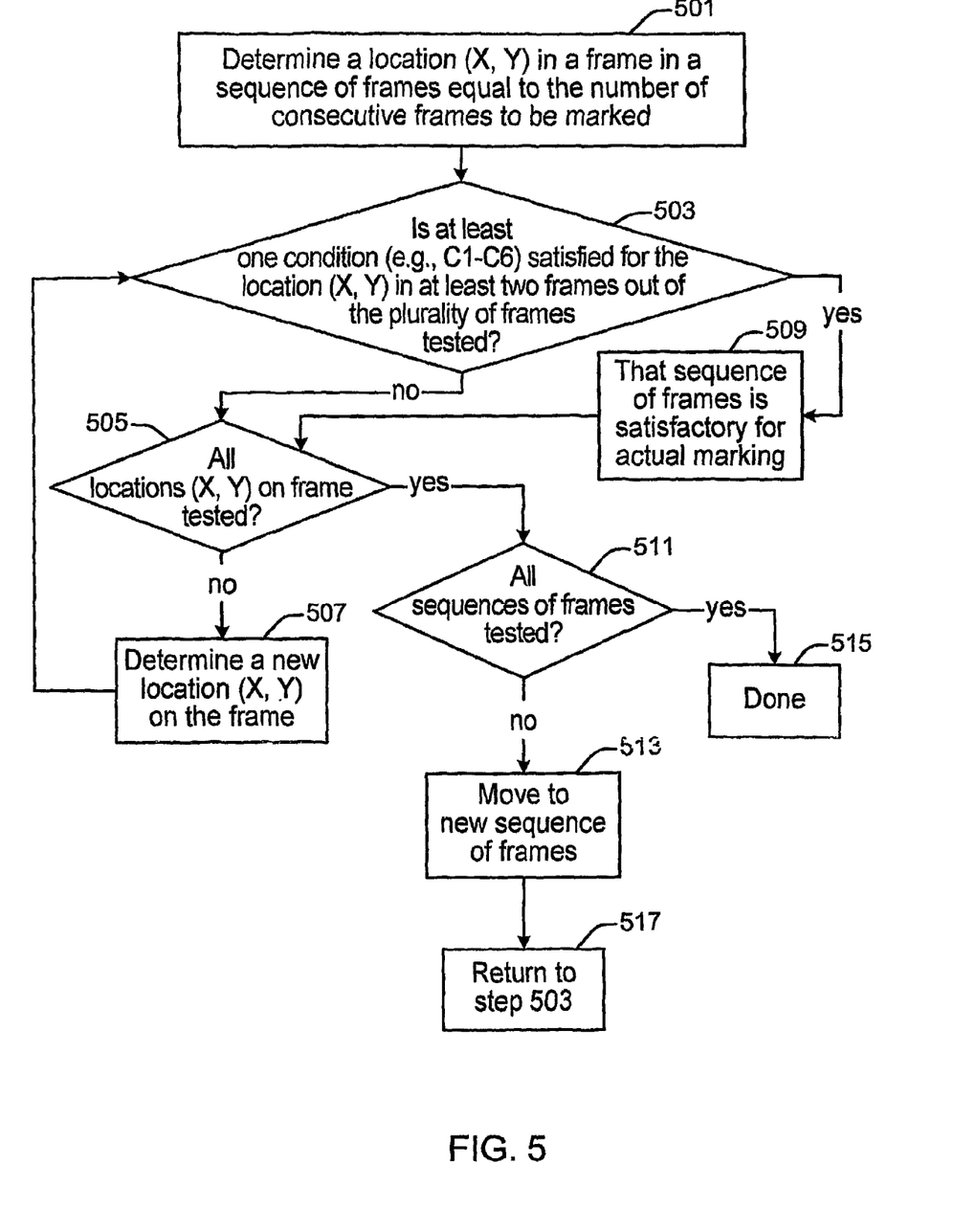
FIG. 5 depicts a flow diagram of a method for determining actual marking locations in image content in accordance with an embodiment of the present invention.

FIG. 5 depicts a flow diagram of a method for determining actual marking locations in image content as recited in step 211 of FIG. 2 and in accordance with an embodiment of the present invention. The method of FIG. 5 begins at step 501 where a particular location, for example, coordinates (X, Y) within a frame in a sequence of frames equal to the number of consecutive frames to be marked (i.e., provided at step 205 of the method of FIG. 2) is determined. For example, if a user in step 205 of the method of FIG. 2 indicated three consecutive frames were desired to be marked in the film, all sets of three consecutive frames in the film are tested in accordance with the present invention. The method proceeds to step 503.

At step 503, it is determined if at least one condition (e.g., C1-C6) is satisfied at a location (X,Y) in at least two out of each three consecutive frames in the film which are tested. If at least one condition (e.g., C1-C6) is satisfied at a location (X,Y) in at least two out of each three consecutive frames the method skips to step 509. If at least one condition (e.g., C1-C6) is not satisfied at a location (X,Y) in at least two out of each three consecutive frames the method proceeds to step 505.

At step 509, the sequence of frames is defined as being satisfactory for actual marking. The method then proceeds to step 505. This ensures that all possible marking locations in each sequence of frames in the film are found. This is advantageous because a studio might not like certain mark locations in a particular sequence and may desire alternative locations in the same sequence. Also, in one embodiment of the present invention, a studio can decide how many marks they desire to be placed in each sequence.

At step 505, it is determined if all locations (X,Y) on each frame have been tested. If all locations (X,Y) on each frame have been tested. If all locations (X,Y) on each frame have been tested the method skips to step 511. If all locations (X,Y) on each frame have not been tested, the method proceeds to step 507.

At step 507, a new location on the frame is chosen for testing. The method then returns to step 503.

At step 511, it is determined whether all sets of three consecutive frames (all sequences) in the film have been tested. If all sets of three consecutive frames in the image content (film) have been tested, the method skips to step 515. If all sets of three consecutive frames (all sequences) in the film have not been tested, the method proceeds to step 513.

At step 515, the method is exited.

Returning to step 513, at step 513, a new sequence of frames is selected. The method then proceeds to step 517.

At step 517, the method returns to step 503.

The concepts of the present invention enable marks to be as invisible as possible, yet robust, and further include a color analysis during the determination of ideal marking locations. If a potential marking area does not meet at least one of the recommended or acceptable conditions, the area will not be indicated as suitable for marking and a next test area can be analyzed in accordance with the present invention. Marks are thus optimized in specific locations and are therefore durable and robust such that a film marked according to the present invention provides minimal impact to the film viewer, while ensuring maximum likelihood of successful forensic analysis, identification and mark recovery during evaluation of an illegally copied film marked in accordance with the concepts of the present invention.

Having described preferred embodiments for a system and method for analyzing and marking a film (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method for determining marking locations in a film comprising:
   determining color conditions compatible with a proposed mark;
   identifying frames to be marked;
   determining potential marking areas within an image of said identified frames;
   analyzing color components of the potential marking areas to generate color values; and
   comparing the color values of the potential marking areas with the determined color conditions for determining marking areas.

2. The method of claim 1, further comprising providing the film in computer-readable form for input to a prescreening device.

3. The method of claim 1, wherein the step of determining potential marking areas comprises:
   superimposing a grid on the image;

determining the position of the grid relative to the image; and selecting the potential marking areas as comprising points of intersection of the identification axes.

4. The method of claim 1, wherein the frames to be marked comprises at least two consecutive frames.

5. The method of claim 1, wherein the color conditions comprise maximum, minimum and standard deviation values of each color RGB.

6. The method of claim 1, wherein the color conditions comprise a first level of recommended RGB values and a second level of acceptable RGB values.

7. The method of claim 1, wherein the step of analyzing comprises:

determining if the image is in RGB color format;

selecting a test area around the potential marking areas; and determining the mean and standard deviation values for the color components of the RGB in the test area.

8. The method of claim 7, wherein the step of comparing comprises determining whether mean and standard deviation color values of the test area are within at least one of the color conditions.

9. The method of claim 7, wherein the test area comprises an area of $L_{pixels} \times L_{pixels}$ surrounding each potential marking area, wherein L=the distance between two horizontal axes, $L_{pixels}=N \times L_{microns}$ and N=a number of pixels per micron.

10. The method of claim 1, further comprising:

determining a location (X,Y) in the frames to be marked; and determining if at least one color condition is satisfied for the location (X,Y) in at least two consecutive frames.

11. A method for analyzing color in a film for determining marking areas for placement of a mark comprising:

determining color conditions compatible with the mark;

determining a number of frames in the film to be marked;

determining at least one potential marking area within at least one of said frames;

analyzing colors in a test area surrounding the at least one potential marking area to generate test area color values; and comparing the color values of the test area with the color conditions for determining if the at least one potential marking area is acceptable for placement of the mark.

12. The method of claim 11, wherein the test area color values comprise mean and standard deviation values for each color RGB in the test area.

13. The method of claim 11, wherein the color conditions comprise maximum, minimum and standard deviation values of each color RGB.

14. The method of claim 13, wherein the color conditions comprise a first level of recommended RGB values and a second level of acceptable RGB values.

15. A system for analyzing and marking a film comprising:

a prescreening device configured to superimpose a depiction of potential marking areas on the film, the prescreening device including a marking module, the marking module comprising:

a color analyzer configured to analyze color in potential marking areas of frames of the film; and a sequence analyzer configured to analyze and select frames for determining marking locations in the film based on results of the color analyzer.

16. The system of claim 15, further including a scanning device in communication with the prescreening device to convert a film print to computer-readable form.

17. The system of claim 15, further including a database in communication with the prescreening device to store a set of pre-defined conditions.

18. The system of claim 17, wherein the color analyzer is configured to compare mean and standard deviation color values of a test area around the potential marking areas with the pre-defined conditions.

19. The system of claim 15, wherein the potential marking areas comprise points of intersection of a plurality of intersecting identification axes of a grid.

20. The system of claim 15, further including a film printer in communication with the prescreening device.

* * * * *